(12) United States Patent  
Valade et al.

(10) Patent No.: US 6,613,185 B1  
(45) Date of Patent: Sep. 2, 2003

(54) CURABLE SILICONE ELASTOMER AND PROCESS OF PRODUCTION THEREOF AND METHOD OF BONDING THEREWITH

(75) Inventors: Joseph A. Valade, Schaghticoke, NY (US); Ned J. Reo, Saratoga Springs, NY (US)

(73) Assignee: Specialty Silicone Products, Inc., Ballston Spa, NY (US)

( * ) Notice: Subject to any disclaimer, the term of this patent is extended or adjusted under 35 U.S.C. 154(b) by 78 days.

(21) Appl. No.: 09/624,052

(22) Filed: Jul. 24, 2000

(51) Int. Cl.[7] ............................................... C08G 77/04
(52) U.S. Cl. ...................................... 156/329; 528/901
(58) Field of Search ........................... 156/329; 528/901

(56) References Cited

U.S. PATENT DOCUMENTS

| | | |
|---|---|---|
| 2,938,009 A | 5/1960 | Lucas |
| 3,159,601 A | 12/1964 | Ashby |
| 3,159,662 A | 12/1964 | Ashby |
| 3,220,972 A | 11/1965 | Lamoreaux |
| 3,635,743 A | 1/1972 | Smith |
| 3,775,452 A | 11/1973 | Karstedt |
| 3,847,199 A * | 11/1974 | Meier et al. .................. 156/329 |
| 4,340,709 A | 7/1982 | Jeram et al. |
| 4,604,444 A * | 8/1986 | Donnadieu et al. ......... 528/901 |
| 5,364,921 A * | 11/1994 | Gray et al. ................... 156/329 |

FOREIGN PATENT DOCUMENTS

| EP | 459675 | * 12/1991 | ................. 156/329 |
|---|---|---|---|

* cited by examiner

Primary Examiner—Jeff H. Aftergut  
(74) Attorney, Agent, or Firm—Schmeiser, Olsen & Watts

(57) ABSTRACT

A composition is disclosed that cures to form a high strength adhesive bond with properties suitable for use in sealing the parts of ranges and other appliances together, without the necessity for a controlled humidity curing environment and without necessity for special ventilation equipment. The present invention describes a self-bonding curable silicone elastomer containing, inter alia, certain unsaturated aliphatic trialkoxysilanes, such as allyltrimethoxysilane, and having physical properties ideal for bonding glass or metal substrates in glass-top or ceramic-top ranges and ovens.

2 Claims, 1 Drawing Sheet

CURABLE SILICONE ELASTOMER AND PROCESS OF PRODUCTION THEREOF AND METHOD OF BONDING THEREWITH

BACKGROUND OF THE INVENTION

1. Technical Field

This invention relates to addition curable liquid silicone compositions that are self-bonding to a substrate, and methods for using such an adhesive as a sealant. In particular, this invention relates to a silicone composition that is self-bonding to a substrate when it cures at room temperature, and which provides a high strength adhesive bond between two substrates without requiring humidity control or ventilation equipment.

2. Background Art

In the manufacture of ranges and oven appliances, a glass or ceramic heating surface is attached to a frame using a form-in-place gasket, seal or adhesive. The gaskets of the related art are generally made from one-part room-temperature vulcanizing (RTV) silicone sealants that typically require more than 24 hours to cure in a carefully controlled high relative-humidity environment with ventilation. Further, such one-part RTVs generally fail to provide the dimensional stability and mechanical qualities that are ideal for a seal or gasket on a range or an other appliance.

SUMMARY OF THE INVENTION

The present invention overcomes the deficiencies of the related art by providing a composition that cures to form a high strength adhesive bond with properties suitable for use in sealing the parts of ranges and other appliances together, without the necessity for a controlled humidity curing environment and without necessity for special ventilation equipment. The present invention describes a self-bonding curable silicone elastomer containing, inter alia, certain unsaturated aliphatic trialkoxysilanes, such as allyltrimethoxysilane, and having physical properties ideal for bonding glass or metal substrates in glass-top or ceramic-top ranges and ovens.

BRIEF DESCRIPTION OF THE DRAWINGS

These and other features and advantages of this invention will be more readily understood from the following detailed description of the various aspects of the invention taken in conjunction with the accompanying drawings in which.

DETAILED DESCRIPTION OF THE INVENTION

Figure 1:
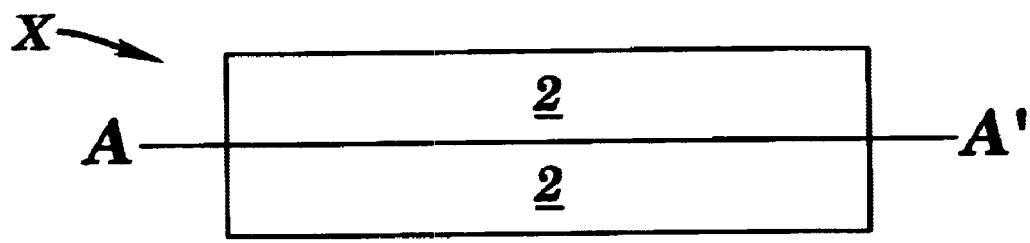
FIG. 1 depicts a top view of an assembly, X, having an adhesive bond between adjacent surfaces of first and second substrates, wherein the line between A and A' defines the plane of the cross-section depicted in FIG. 2.

Many RTVs of the related art are sold as one-component adhesives that are cured by exposure to atmospheric moisture (condensation-cure), or by elevating their temperatures to a prescribed level to induce curing (heat cure). Many RTVs that cure (i.e., vulcanize) upon exposure to atmospheric moisture require a carefully controlled relative humidity environment that in turn often requires manufacturers to maintain expensive moisture control systems. Also, such condensation-curing compositions usually release, as an intended by-product of curing, substantial quantities of hazardous gases and odors such as methanol and/or acetic acid and/or ammonia which must be monitored, isolated or vented. Acetic acid has a pungent smell which is similar to the smell of vinegar. Methyl Alcohol (i.e., Methanol) is a hazardous substance. Ammonia gas is an irritant. Generally, when these one-component RTV compositions liberate gasses while curing, they are also losing mass and volume, which causes them to contract or shrink excessively, and/or to become porous. Consequently, attempts to use commercially available RTVs to bond substrates together (e.g., glass-to-metal) in the manufacture of products such as range tops have resulted in fissures and cracking in the sealant bead, which renders such RTV sealants unsuitable for counter-top applications, for aesthetic and sanitary reasons. Also, many RTVs of the related art often require 24 hours or more to fully cure, even in a carefully controlled humidity environment, resulting in delays in assembly line production, and/or consuming expensive factory floorspace and/or requiring purchase of larger curing chambers, to accommodate the accumulating volumes of articles undergoing cure. Condensation-cure RTVs generally require a 50% Relative Humidity environment, which is generally not present in comfortable working environment, such as shop floors. Therefore, special curing chambers must be provided to insure curing of condensation cure silicones. Because condensation-cure silicones generally cure from the exposed surface inward, their cure rate decreases with the silicone thickness and where much of the surface of the silicone is covered by non-porous materials such as metal or glass.

Curable silicone elastomers exist that may be stored uncured in 2 parts rather than one. These may be considered superior to one part RTV compositions because all the components necessary for cure are present in the composition. They do not require moisture from an external source to effect cure, nor do they emit cure products such as acetic acid or methanol. Since no by-products are released during curing, self-bonding curable silicone elastomers can be deposited that have good dimensional stability (i.e., low shrinkage and cracking). Two-part silicone compositions generally cure by addition of one part with the other, and are therefore called "addition-cure" silicones. Two-part addition-cure silicone compositions typically employ a catalysed hydrosilylation reaction between vinyl-containing polymers (including vinyl-terminated silicone polymers) and hydride (hydrogen-silicon bond)-containing copolymers. By convention, the A part contains a catalyst, such as Pt and the B part contains a silicon-hydride functionalized siloxane.

Presently, there are no known commercially available two-part addition-cure silicone elastomer compositions that cure at useful rates between 25° C. and 70° C. and have the desirable mechanical properties of a high strength adhesive bond having a Shore A of at least about 35 durometer, tensile strength of at least about 750 psi (5.2 Mpa), elongation of at least 400%, and Tear B of at least about 100 Pi (17.6 KN/M). A further deficiency of the related art's silicones is that commercially available two-part silicone elastomers usually cure only when heated to temperatures above 150° C. (300° F.). The invention remedies these deficiencies by providing self-bonding addition-curable silicone elastomer compositions that cure, at useful rates between about 20° C. and about 70° C., to have the desirable mechanical properties of a high strength adhesive bond having a Shore A of at least about 35 durometer, tensile strength of at least about 750 psi (5.2 Mpa), elongation of at least 400%, and Tear B of at least about 100 Pi (17.6 KN/M).

An embodiment of the present invention comprises a self-bonding curable silicone elastomer that provides a high strength adhesive for glass or ceramic and metal surfaces suitable for use in attaching cooking panels to the metal frames of ovens and ranges. Since such appliances may also comprise components made of plastics, such as thermoplastic, that may soften at temperatures above 100° C., there is a further need for a silicone that cures in the range from about room temperature to about 100° C. in order to avoid softening and thereby deforming the heat sensitive components of appliances that comprise thermoplastic materials, while still providing high strength self-bonding to substrates such as metals and glass and ceramic. In the present invention a self-bonding curable silicone composition is described that produces a high strength adhesive bond to metal and glass and ceramic substrates that comprise the glass top range or oven appliance.

As used hereinafter, the phrase "adhesive failure" means separation of the cured silicone from the substrate at the bond, while the phrase "cohesive failure" means rupture of the silicone layer while the bond to the substrate remains intact. As used herein, the phrase "high strength adhesive bond" is a bond between dissimilar materials formed by elastomeric material having relatively high tensile strength and which fails by cohesive failure rather than adhesive failure. The inclusion of an effective amount of an adhesion promoter enables the formation of the high strength adhesive bond. The effective amount of adhesion promoter is that amount which enables the formation of the high strength adhesive bond.

In an embodiment of the invention, a self-bonding curable silicone elastomer composition comprises a vinyl-terminated polydimethylsiloxane polymer having a viscosity from about 100 to 200,000 centipoise (cps) at 25° C., wherein the wt. % vinyl is from 0.03 to 2.0 wt. %, or from 0.08 to 1.2 wt. % vinyl. Vinyl-terminated polydimethylsiloxane polymers having a viscosity from about 100 to 165,000 cps at 25° C., are available from Gelest, Inc., Tullytown, Pa., under the trade name DMS-V21 through DMS-V52. A process of preparing vinyl-terminated polydimethylsiloxane polymers is described by Jeram et al. in U.S. Pat. No. 4,340,709 and is herein incorporated by reference.

Applicants note that it is a standard chemical shorthand in the field of silicone chemistry to represent various fluids, resins and gums by such general designations as MDM for an M-stopped polydiorganosiloxane where the extent of polymerization increases with repeating D units is unspecified except as to viscosity of the represented polymer. In addition to vinyl-teminated polydimethylsiloxane polymer, the self-bonding curable silicone elastomer comprises from 0.1–25 wt. % Si—H containing polysiloxane crosslinker resin-having the formula, $M_3Q—[QM_2]_x—QM_3$, where $M=HSi(R^1)_2O_{0.5}$ and $Q=SiO_2$, where x and y are each equal to at least 1 and the ratio of $R^1+H$ to Si is from 1.0:2.7 or a Si-H containing polysiloxane crosslinker resin having the formula $M_3Q—[D_2]_x—[QM_2]_yQM_3$, where $M=HSi(R^1)_2O_{0.5}$, $D=Si(R^2_2)O$ and $Q=SiO_2$, where x and y are each equal to at least 1 and the ratio of $R^1+R^2+H$ to Si is from 1.2:2.7 and where $R^1$ and $R^2$ are selected from the group consisting of monovalent saturated hydrocarbon groups such as alkyl, phenyl, aryl, alkylphenyl, cycloalkyl, such as cyclohexyl, and haloakyl groups such as 1,1,1-trifluoropropyl. The silicon-hydride crosslinker resin $M_3Q—[QM_2]_x—QM_3$ where x is equal to at least 1 is available from Gelest, Inc., Tullytown, Pa., under the trade name HQM-105. A process for producing Si-H polysiloxane crosslinker resin is described in U.S. Pat. No. 4,040,101 which is hereby incorporated by reference.

The self-bonding curable silicone elastomer further comprises a platinum catalyst, selected from the group consisting of those having the formula $(PtCl_2 \cdot Olefin)_2$ and $H(PtCl_3 \cdot Olefin)$ as described in U.S. Pat. No. 3,159,601, Ashby, $(PtCl_2 \cdot C_3H_6)_2$ described in U.S. Pat. No. 3,159,662, Ashby, a complex containing chloroplatinic acid with up to 2 moles per gram of platinum selected from a group consisting of alcohols, ethers, aldehydes and mixtures of the above as described in U.S. Pat. No. 3,220,972, Lamoreaux, or, a platinum catalyst that is also a flame retardant, made by reacting chloroplatinic acid containing 4 moles of water of hydration with tetravinyltetramethylcyclotetrasiloxane in the presence of sodium bicarbonate in an ethanol solution, described by U.S. Pat. No. 3,775,452, Karstedt. The best results have been obtained by use of a Platinum (2.1–2.4 percent by weight) complex in divinyltetramethyldisiloxane which is available from Gelest, Inc., Tullytown, Pa., under the trade name SIP6831.0.

The self-bonding curable silicone elastomer further comprises an Si-H coupler such as described by Jeram et al. in U.S. Pat. No. 4,340,709, herein incorporated by reference. A Si—H containing coupler is a linear hydride polysiloxane with the following formula, $(R^3)_2HSiO—(Si(R^4)_2—O)_x—Si(R^3)_2H$, wherein x is equal to at least 1, having a viscosity from 1 to 500 cps at 25° C. and having from about 0.01 to about 0.5 wt. % hydrogen. The $R^3$ and $R^4$ groups are selected from the group consisting of monovalent saturated hydrocarbon groups such as alkyl, phenyl, aryl, alkylphenyl, cycloalkyl such as cyclohexyl, and haloalkyl groups such as 1,1,1-trifluoropropyl. An Si-H containing coupler, $(Me)_2HSiO—[Si(Me)_2—O]_x—Si(Me)_2H$, having a viscosity from 2–3 cps to 500 cps at 25° C., and having 0.01 to 0.5 wt. % hydrogen is available from Gelest, Inc., Tullytown, Pa., under the trade names DMS-HO3, 2–3 cps, DMS-H21, 100 cps, DMS-H25, 500 cps.

Since tensile strength and elongation depend mainly on the total concentration of fumed or precipitated silica in the self-bonding curable silicone elastomer, a person skilled in the art can determine the effective amount of fumed or precipitated silica or mixtures thereof by adjusting the filler concentration to reach a minimum tensile strength not less than about 750 psi (5.2 Mpa), and elongation not less than about 400% without the viscosity of the composition exceeding 500,000 cps at 25° C., and more preferably not exceeding 200,000 cps at 25° C. Ideally, the fumed silica or precipitated silica are treated with cyclic siloxane, described in U.S. Pat. No. 2,938,009, Lucas, or with hexamethyldisilazane, described in U.S. Pat. No. 3,635,743 and Beers, patent application, Ser. No. 311,486, filed Dec. 4, 1972, which are herein incorporated by reference. Good results have been obtained in an embodiment of the invention comprising an effective amount of D4 and HMDZ treated silicon dioxide having a surface area from about 150 to 400 m$^2$/g, available from the Degussa Corp. under the trade name Aerosil 380 or alternatively HS-5 from the Cabot Corp., where the effective amount was approximately 10 to 30 percent by weight of the entire composition. Precipitated silica having a surface area from about 160 to 200 m$^2$/g is available under the trade name of Zeothix 95 from J. M. Huber, Corp., Atlanta, Ga. Extending fillers such as 5 micron minusil is available from Gelest, Inc., Tullytown, Pa., under the trade name SIS6964.0, may be substituted for fumed silica or precipitated silica, thereby increasing the tensile strength of the elastomer without increasing the viscosity of the uncured composition unnecessarily.

Figure 2:
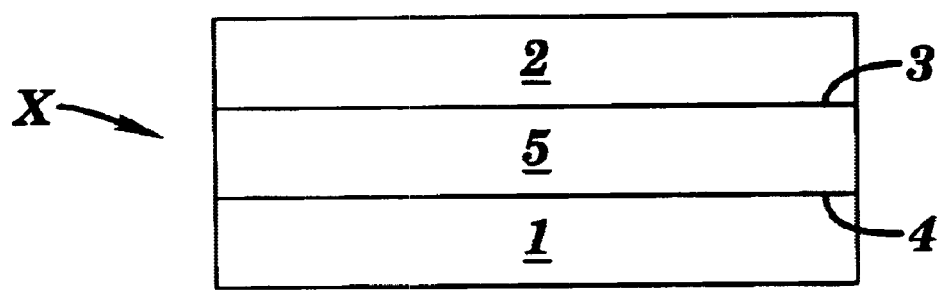
FIG. 2 depicts a cross-section of an assembly, X, having an adhesive bond between adjacent surfaces of first and second substrates, according to a preferred embodiment of the present invention.

Since formation of a high strength adhesive bond depends mainly on the concentration of a self-bonding additive (i.e., adhesion promoter) a person skilled in the art can determine the effective amount of adhesion promoter to add to the self-bonding curable silicone composition by adjusting the concentration of the adhesion promoter such that when the adhering substrates depicted in FIGS. 1 and 2 are separated by rupturing the bond, 5, between them, the bond fails cohesively instead of adhesively.

The self-bonding silicone elastomer of this embodiment further comprises an effective amount of a self-bonding additive such as for example, an organosilane; wherein the organosilane consists of a silicon atom bonded to $R^6$, $R^7$, $R^8$ and $R^9$ groups, and wherein $R^6$ is selected from the class consisting of vinyl, allyl, alkynl, propargyl, 2-butenyl, 3-methacryloxypropyl and 2-butynl groups and $R^7$, $R^8$ and $R^9$ are selected from the class consisting of methyl, methoxy, ethoxy, propoxy, and acetoxy groups. The self-bonding additive (i.e., adhesion promoter) may include allyltrimethoxysilane, such as is available from Gelest, Inc., Tullytown, Pa., under the trade name SIA0540.0. Finally, the self-bonding curable silicone elastomer may further comprise a pigment as a component of the filler, or as an additional component. A pigment may for example be selected from the group consisting of dyes made by dispersing transition metal oxides having a desired color in polymethylsiloxane oils, such as are available from Gelest, Inc., Tullytown, Pa., or a black iron oxide dispersed in divinyl silicone fluid, available as a black paste from Dispersion Technology, Inc. in Lakewood, N.J. under the trade name DTCOLOR K-73829.

The specific examples given below are given for the purpose of illustrating the present invention and are not for the purpose of limiting the disclosure in the present case. All parts in the examples are by weight.

EXAMPLE 1

In one embodiment, the self bonding curable silicone elastomer comprises 100 parts by weight of the addition curing silicone composition described by Jeram et al., U.S. Pat. No. 4,340,709, and further comprises from about 0.002 to 6.67 parts by weight platinum in divinyltetramethyldisiloxane, such as is available from Gelest, Inc., Tullytown, Pa., under the trade name SIP6831.0. The self-bonding silicone elastomer of this embodiment further comprises an effective amount of a self-bonding additive such as for example, from about 0.8 to about 1.2 parts by weight, nominally about 1 part by weight allyltrimethoxysilane. The resulting self-bonding curable silicone elastomer of this embodiment cures in less than 10 minutes in the range from about 70° C. to about 100° C. and cures in less than 24 hours when allowed to stand at room temperature, (e.g. any temperature in the range of from about 20° C. to about 30° C.).

EXAMPLE 2

In an alternative embodiment of the present invention, the self bonding curable silicone elastomer of the invention may comprise 50 parts by weight of commercially available compositions such as General Electric LIM 8040® A and 50 parts by weight of commercially available compositions such as General Electric LIM 8040® B. GE LIM 8040® A and B are available from GE Silicone Products Dept. of Waterford, N.Y., and are matched for use in a 1:1 ratio (by volume). The material safety data sheets (MSDS) for GE LIM 8040® disclose that the LIM 8040® composition comprises from about 120 to about 160 parts by weight vinylpolydimethylsiloxane, from about 10 to about 20 parts by weight of a vinyl-stopped dimethyl-methylvinylsiloxane, from about 1 to about 5 parts by weight of a polymethylhydrogensiloxane and from about 20 to about 60 parts by weight of fillers selected from the group consisting of octamethylcyclotetrasiloxane (D4) treated silicon dioxide, hexamethyldisilazane (HMDZ) treated silicon dioxide, and silicon dioxide treated with mixtures of hexamethyldisilazane and octamethylcyclotetrasiloxane.

The amount of a dispersed platinum catalyst controls the rate of cure of the self-bonding curable silicone elastomer at a given temperature, such that the higher the amount, the faster the cure. Platinum could be added to either General Electric LIM 8040® A or General Electric LIM 8040® B. However, addition of platinum to the B part, which comprises a hydrogen-containing polysiloxane can cause evolution of gaseous hydrogen by the following reaction:

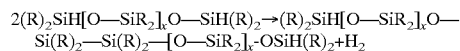

Therefore, Pt is preferably added to General Electric LIM 8040® A, which comprises mainly a vinyl-terminated polysiloxane, and is relatively inert until the A and B parts are mixed, wherein Pt catalyzes a hydrosilation addition cure reaction. In practice, a person skilled in the art determines the effective amount of platinum based on determining the concentration of platinum required to obtain optimal cure time and temperature based on a productivity and quality cost/benefit analysis, weighing the costs and benefits based on cost of providing a controlled heated environment using shorter cure times versus a room temperature environment using up to 24 hour cure times, then determining by simple experimentation the effective amount of platinum that must be added to the other ingredients of the embodiment to achieve the desired cure rate using a temperature such that cure will be as fast as may be desirable.

In an embodiment of the present invention, a composition A was prepared by charging a doughmixer or like mixing machine with 50 parts by weight GE LIM 8040® A. To this was added from about 0.8 to about 1.2 parts by weight, nominally about 1 part by weight allyltrimethoxysilane, from about 0.14 to about 0.18 parts by weight of a complex comprising Pt (2.1–2.4 wt. percent) in divinyltetramethyldisiloxane) and an effective amount of pigment such as black iron oxide to provide coloring. A self-bonding curable silicone elastomer of the present invention is formed by combining with mixing 50 parts by weight of composition A with 50 parts by weight of GE LIM® 8040B. Since both composition A and GE LIM® 8040B are flowable liquids before mixing and therefore pumpable, adequate metering of composition A and GE LIM® 8040B may be achieved using gear pumps or the equivalent and feeding the desired volume ratio of composition A to GE LIM® 8040B to an in-line mixing device such as a static mixer (using the specific gravity, weight/volume, of the A and B parts to determine the volume required to provide 50 parts by weight of the A and B). It is also desirable to remove air or foreign matter, since presence of these creates voids in the cured elastomer that generally reduces its tensile strength and degrades it aesthetic appeal. Therefore, each line to the mixing device should be equipped with means for applying in-line vacuum and filtering.

The mixed A and B may immediately become thixotropic, yielding a high viscosity curable liquid silicone composition enabling its application in a bead, spot or any other configuration on a substrate, even on a vertical surface, since the mixed parts are not flowable. After applying the adhesive composition onto the surface, 4, of substrate 1, it can be effectively cured within 24 hours at room temperature, or in less than 10 minutes when heated from about 70° C. to about 100° C.

FIG. 1 depicts a top view of an assembly, X, wherein a line between A and A' defines a plane of the cross-section depicted in FIG. 2. FIG. 2 depicts forming an adhesive bond in assembly X, between adjacent surfaces, 3 and 4, of a first substrate, 1, and a second substrate, 2, by depositing a self-bonding curable silicone elastomer onto the surface, 4, of the first substrate, 1, and contacting the silicone elastomer with the surface, 3, of the second substrate, 2, according to a preferred embodiment of the present invention. The process of applying a self-bonding curable silicone elastomer sealant and adhesive to a surface, 3, of substrate 1 may be accomplished by feeding the output from the static mixer to a dispensing head that applies a bead, 5, spot or other configuration of the mixed A and B on a substrate, 1, such as the inner metal frame or cooking panel of the range or oven appliance. Depositing the self-bonding curable silicone elastomer on a surface, 4, of a substrate, 1, may be performed by using automated pumping and metering equipment and robotics to deposit the silicone elastomer gasket, sealant or adhesive. The self-bonding curable silicone elastomer thus applied cures in less than 10 minutes in the range from about 70° C. to about 100° C., and curing times less than 24 hours may be achieved at room temperature (i.e., from 20° C. to 30° C.), regardless of humidity and without need for special ventilation equipment. Curing at any temperature in the range from about 20° C. to about 100° C. will result in a high strength adhesive bond having a Shore A durometer of at least about 35 durometer, tensile strength of at least about 750 psi (5.2 Mpa), elongation of at least 400%, and Tear B of at least about 100 Pi (17.6 KN/M). Experiments have yielded a high strength adhesive bond embodiment of the invention having a Shore A durometer of 42, tensile strength of 900 psi (6.2 Mpa), elongation of 580%, and Tear B of about 130 Pi (22.8 KN/M).

Since the cure rate depends mainly on the total platinum concentration in the mixed A and B, and the temperature, a person skilled in the art can determine the effective amount of platinum catalyst to add to part A by adjusting the platinum level to reach the desired cure rate and temperature such that cure should be as fast as desired. In an embodiment of the invention, the platinum concentration in the total curable silicone composition is from about 10 to about 1500 parts per million and the temperature from about room temperature to about 100° C., or more preferably the platinum concentration is from about 20 to about 1500 parts per million and the temperature from about 250° C. to about 800° C. Curing temperature may be selected to conform to the ability of the substrate or of thermoplastic components of the appliance to withstand heat without distortion, in a thermal curing oven or an oven that uses an infrared source of heat.

The following examples are exhibited so that one skilled in the art may better understand the achievable properties of the invention. They are given by way of illustration and not by way of limitation.

TABLE 1

Bonding Properties of Self-Bonding Curable Silicone Elastomer (With Addition of Pt) (using allyltrimethoxysilane as adhesion promoter)

| Substrate | Failure Mode | Lap Shear Strength (psi) |
|---|---|---|
| room temp (25° C.)/24 hrs. | | |
| Steel | Cohesive | 750–900 |
| Glass | Cohesive | 750–900 |
| 70° C./7 minutes. | | |
| Steel | Cohesive | 750–900 |
| Glass | Cohesive | 750–900 |

For purposes of comparison, the properties of unmodified GE LIM 8040® are provided in the following Table 2.

TABLE 2

GE LIM 8040 Bonding Properties

| Substrate | Failure Mode | Lap Shear Strength (psi) |
|---|---|---|
| room temp (25° C.)/24 hrs. | | |
| Steel | Skins Over. Does not cure. | Not Measurable |
| Glass | Skins Over. Does not cure. | Not Measurable |
| 70° C./7 minutes. | | |
| Steel | Skins Over. Does not cure. | Not Measurable |
| Glass | Skins Over. Does not cure. | Not Measurable |

After mixing the two parts of the present invention, the self-bonding curable liquid silicone composition that results can be applied as a bead, spot or any other configuration on a substrate, even on a vertical surface. Since the bead remains fixed in place, a first advantage of the present invention is that automated dispensing equipment and robotics may be used to apply the self-bonding curable silicone elastomer to a substrate. A second advantage is formation of a self-bonding curable silicone elastomer, wherein cure is less than 10 minutes in the temperature range from about 70° C. to about 100° C., and less than 24 hours when allowed to stand at room temperature, e.g. from about 20° C. to about 30° C. These temperatures are lower than the softening point of most thermoplastics, including polycarbonate, used in the manufacture of glass top ranges and ovens and lower than the typical 150° C. required to cure commercially available silicone elastomers such as GE LIM 8040®. Therefore, when the self-bonding (i.e., adheres to substrate without need for application of any primer to the substrate) silicone elastomer of the present invention is used to affix a glass stove top to a range or oven metal frame there is no requirement to utilize costly ovens to effect cure. Since the cure mechanism does not require additional heat or moisture and does not off-gas corrosive acetic acid or toxic methanol, the glass top range and stove assemblies may cure for less than 24 hours in any holding area, resulting in the formation of a strong, durable bond between the cured silicone adhesive, the glass or ceramic stove top and the range or oven metal frame.

We claim:

1. A curable silicone elastomer composition comprising:
   100 parts by weight of a vinyl-containing polydimethylsiloxane polymer;
   from about 0.002 to about 6.67 parts by weight platinun;
   from about 0.5 part to about 1.5 parts by weight of allyltrimethoxysilane;

from about 5 to about 100 parts by weight of filler selected from the group consisting of precipitated silica, fumed silica and mixtures thereof;

from about 0.1 to about 25 parts by weight of an Si-H containing polysiloxane crosslinker resin;

a linear hydride polysiloxane coupler having a viscosity from about 1 to about 500 centipoise at 25° C.; and wherein the elastomer cures at a temperature from about 20° C. to about 100° C., to form a high strength adhesive bond having a Shore A durometer of at least about 35 durometer, tensile strength of at least about 750 psi (5.2 Mpa), elongation of at least 400%, and Tear B of at least about 100 Pi (17.6 KN/M).

2. (NEW) A curable silicone elastomer composition comprising:

100 parts by weight of a vinyl-containing polydimethylsiloxane; polymer;

from about 0.002 to about 6.67 parts by weight platinum;

from about 0.5 part to about 1.5 parts by weight of allyltrimethoxysilane;

from about 5 to about 100 parts by weight of filler selected from the group consisting of precipitated silica, fumed silica and mixtures thereof;

from about 0.1 to about 25 parts by weight of an Si-H containing polysiloxane crosslinker resin; and a linear hydride polysiloxane coupler having a viscosity from about 1 to about 500 centipoise at 25° C.

* * * * *

UNITED STATES PATENT AND TRADEMARK OFFICE
CERTIFICATE OF CORRECTION

PATENT NO. : 6,613,185 B1　　　　　　　　　　　　　　　　　　　　　　　Page 1 of 1
DATED : September 2, 2003
INVENTOR(S) : Valade et al.

It is certified that error appears in the above-identified patent and that said Letters Patent is hereby corrected as shown below:

Column 5,
Line 58, insert a space between "Example" and "2".

Column 8,
Line 65, delete the word "platinun" and insert -- platinum --.

Column 9,
Line 14, delete the word "(NEW)".

Signed and Sealed this

Twenty-third Day of December, 2003

JAMES E. ROGAN
*Director of the United States Patent and Trademark Office*